Aug. 28, 1928.

E. W. BROHOLM 1,682,595

SHOCKING MACHINE

Filed Aug. 28, 1925

Edwin W. Broholm
INVENTOR

BY Victor J. Evans
ATTORNEY

WITNESS: J.T.L. Wright

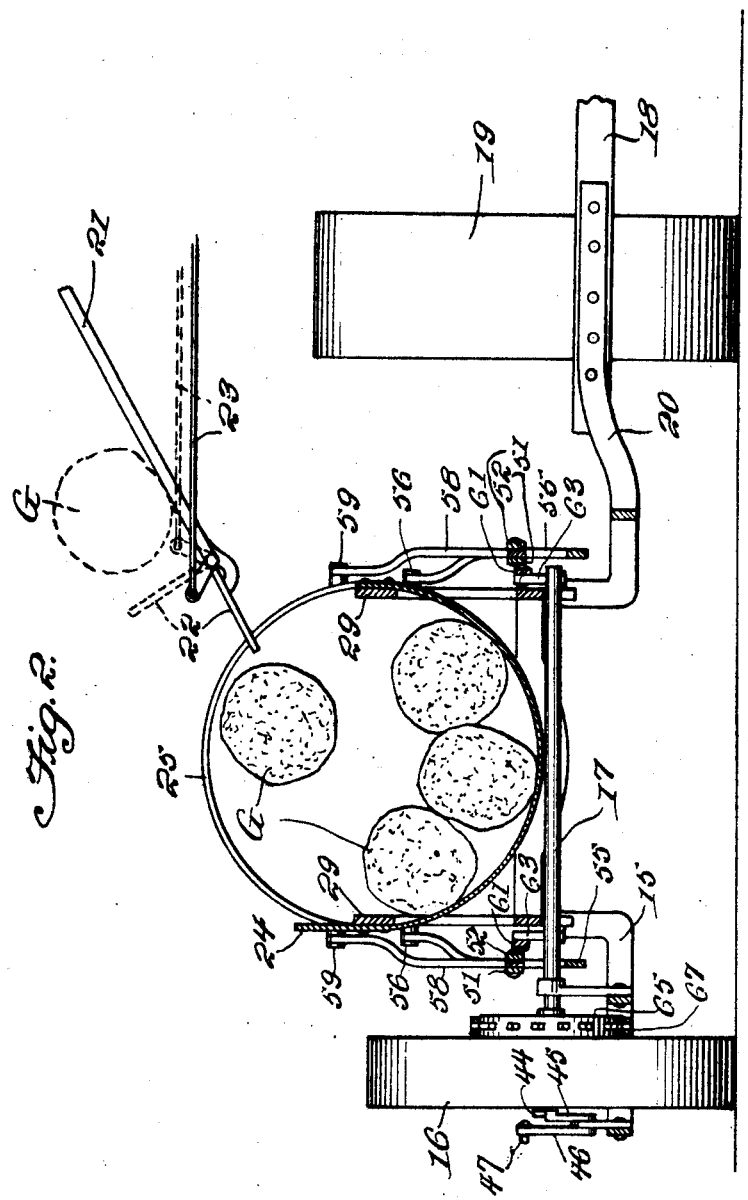

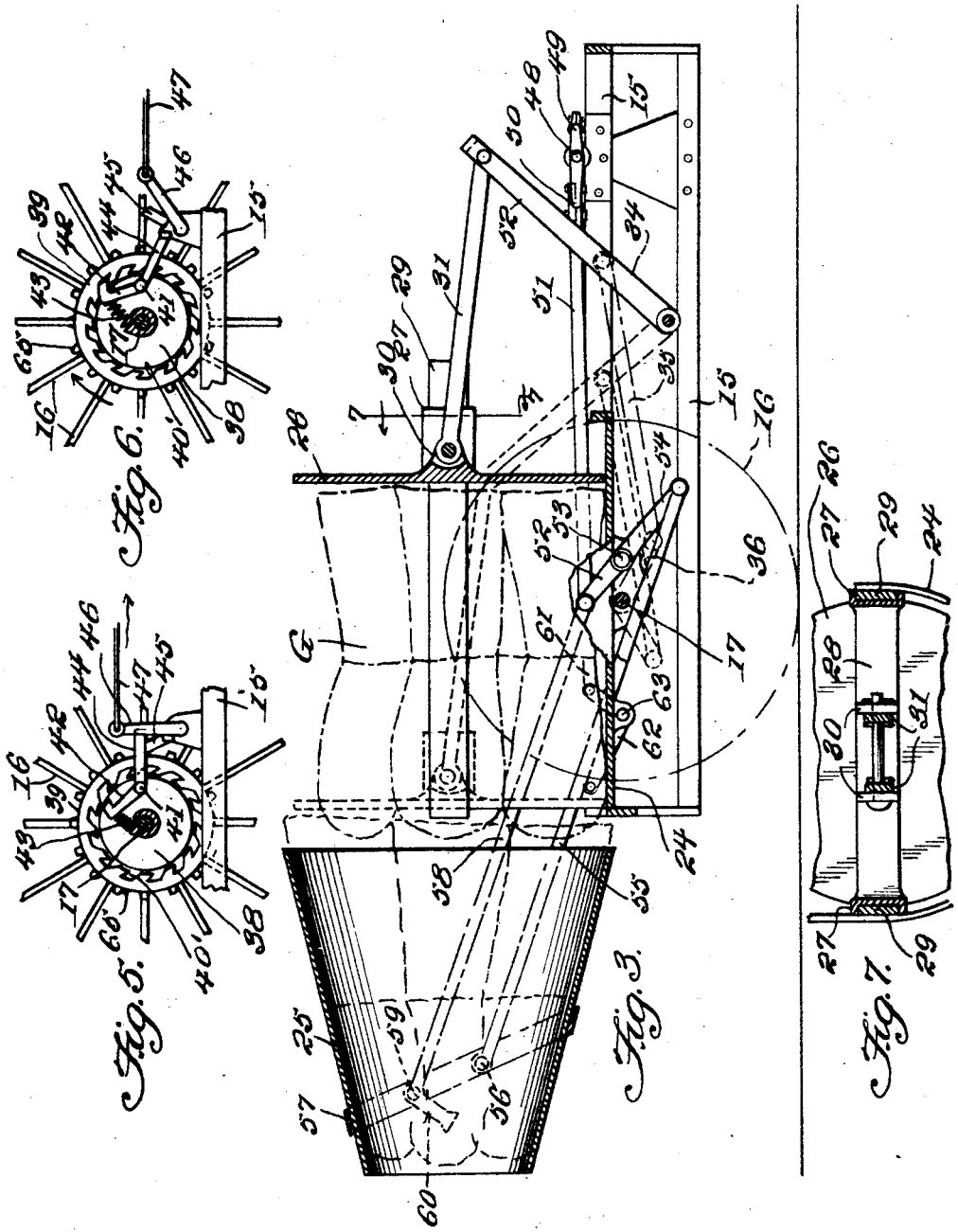

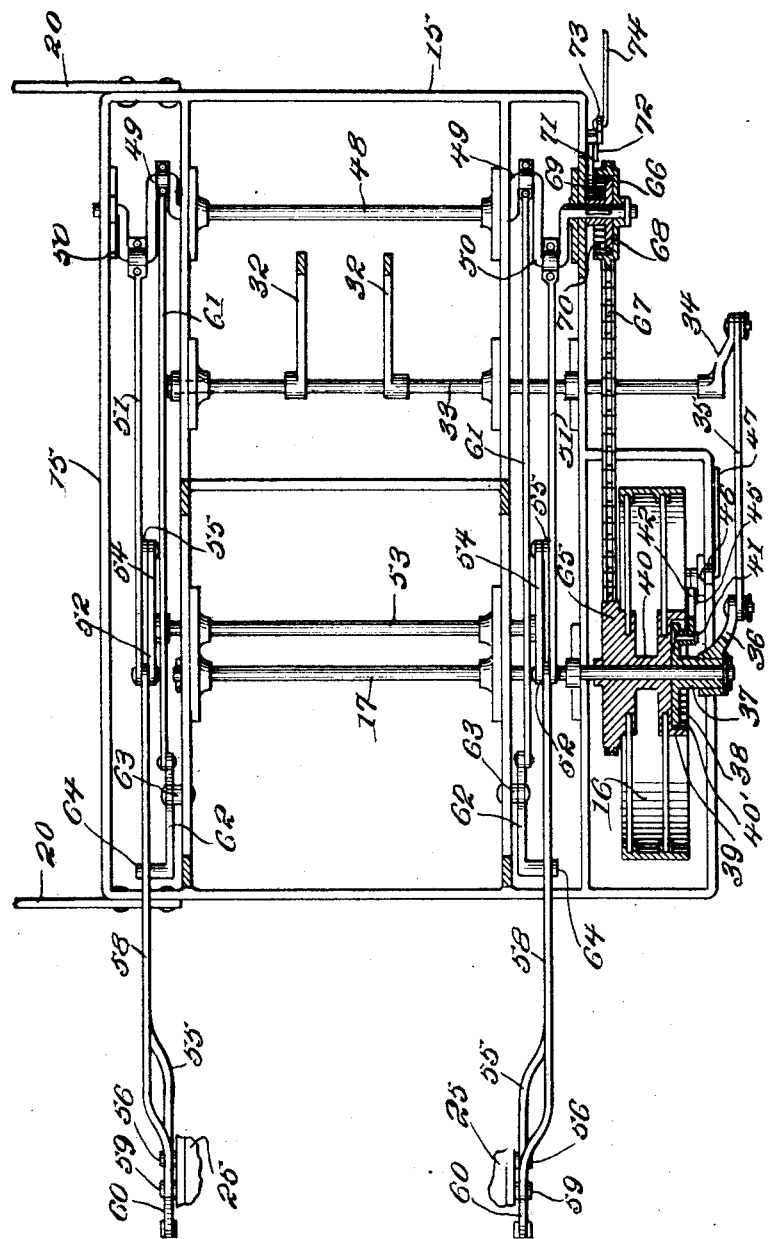

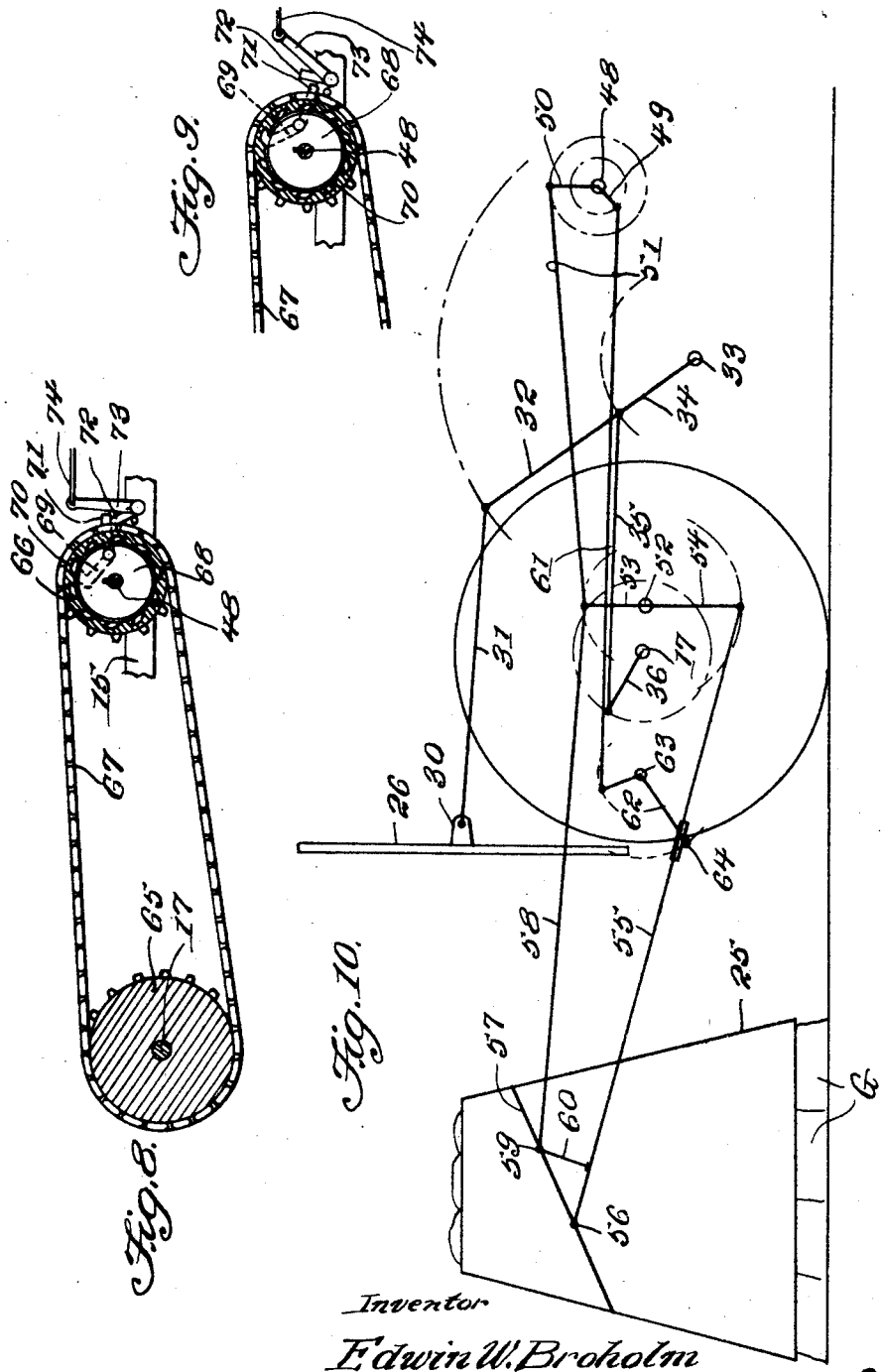

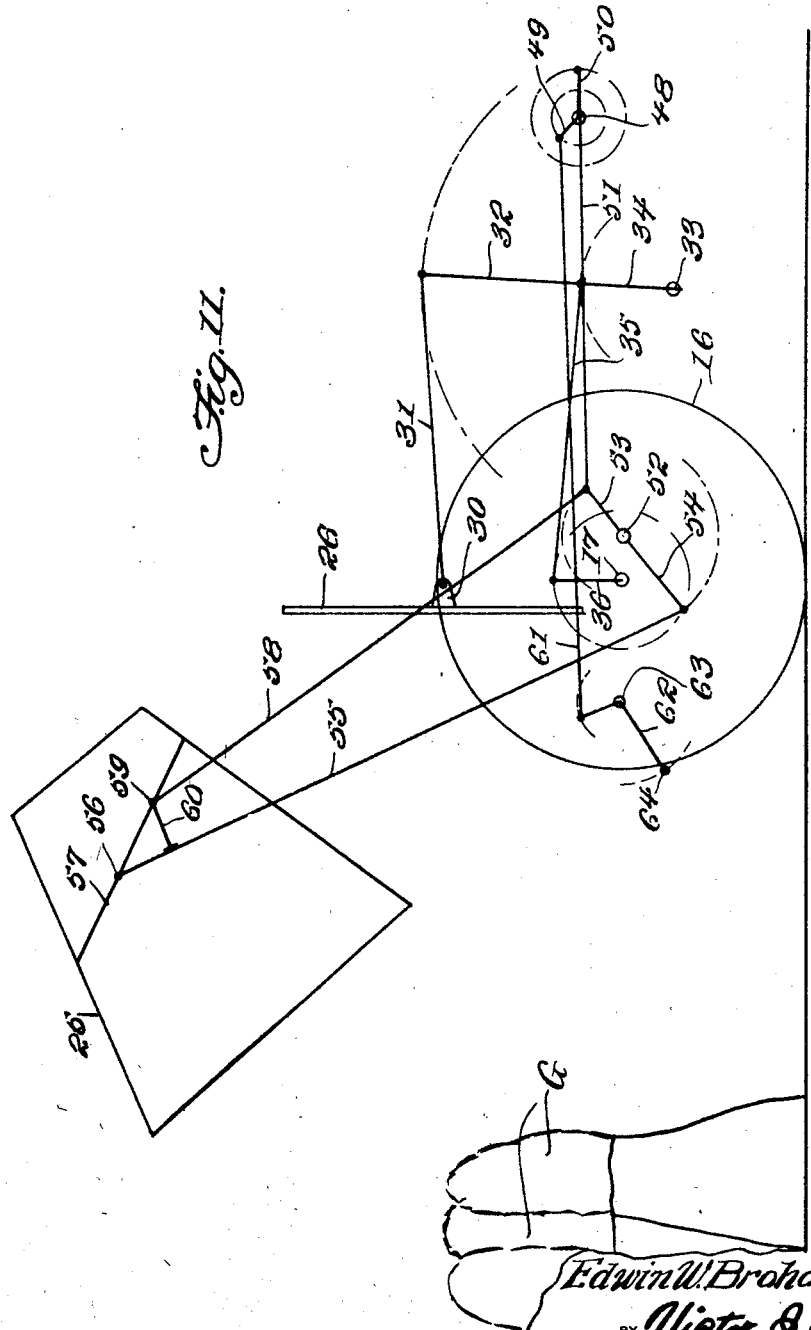

Aug. 28, 1928.
E. W. BROHOLM
1,682,595
SHOCKING MACHINE
Filed Aug. 28, 1925   7 Sheets-Sheet 7
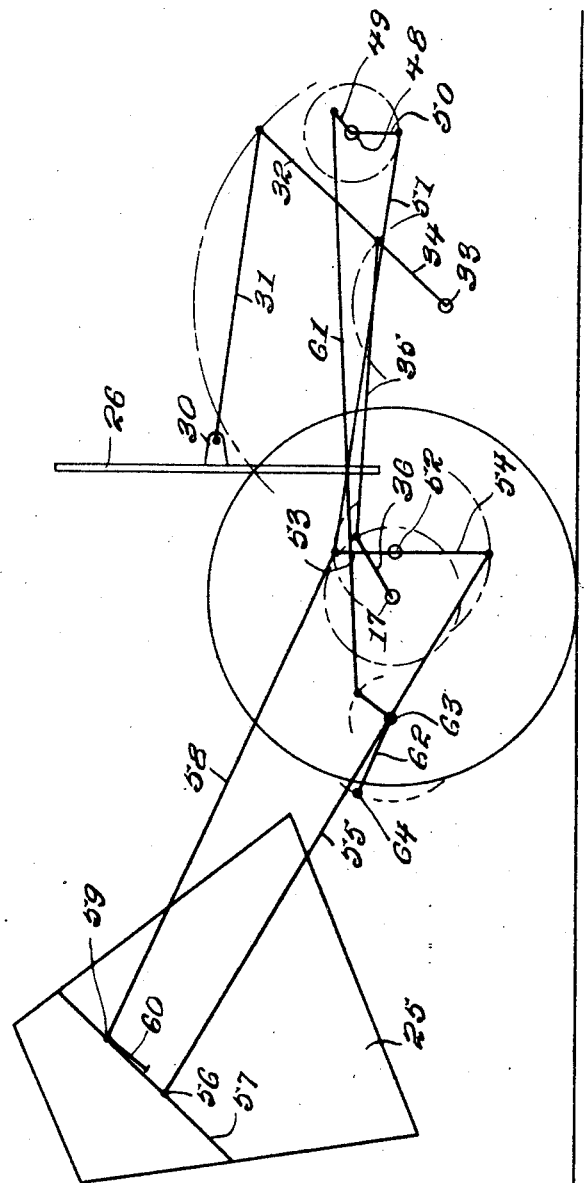
Edwin W. Broholm
INVENTOR
BY Victor J. Evans
ATTORNEY
WITNESS: J. T. L. Wright Patented Aug. 28, 1928.

1,682,595

UNITED STATES PATENT OFFICE.

EDWIN W. BROHOLM, OF TWODOT, MONTANA.

SHOCKING MACHINE.

Application filed August 28, 1925. Serial No. 53,184.

This invention relates to shocking machines and has for an object the provision of a machine of this character which may be attached to a harvesting machine in such manner as to receive the bundles of grain and arrange said bundles in shock formation and deposit them upon the ground.

Another object of the invention is the provision of a shocking machine which includes a bundle moving mechanism and a shock former, means being provided for manually controlling the operation of the bundle moving means so that the same may be moved at the will of the operator, together with means for controlling the shock former so that the shocked bundles may be deposited at the will of the operator.

With the above and other objects in view, the invention further includes the following novel features and details of construction, to be hereinafter more fully described, illustrated in the accompanying drawings and pointed out in the appended claims.

In the drawings:—

Figure 2 is a sectional view taken substantially on the line 2—2 of Figure 1, and illustrating a portion of a harvesting machine to which the shocking machine is attached.

Figure 3 is a longitudinal sectional view.

Figure 4 is a horizontal section.

Figure 5 is a fragmentary elevation showing the bundle moving clutch mechanism in an inactive position.

Figure 6 is a similar view with the clutch mechanism engaged.

Figure 7 is a fragmentary section taken substantially on the line 7—7 of Figure 3.

Figure 8 is a fragmentary view partly in section illustrating the driving mechanism for operating the shock former, the clutch of this mechanism being in disengaged position.

Figure 9 is a fragmentary view with the shock former clutch engaged.

Figure 10 is a diagram showing the machine in position for depositing a shock.

Figure 11 is a similar view with the shock released.

Figure 12 is a like view showing the position of the parts just prior to their return to normal position.

Figure 1:
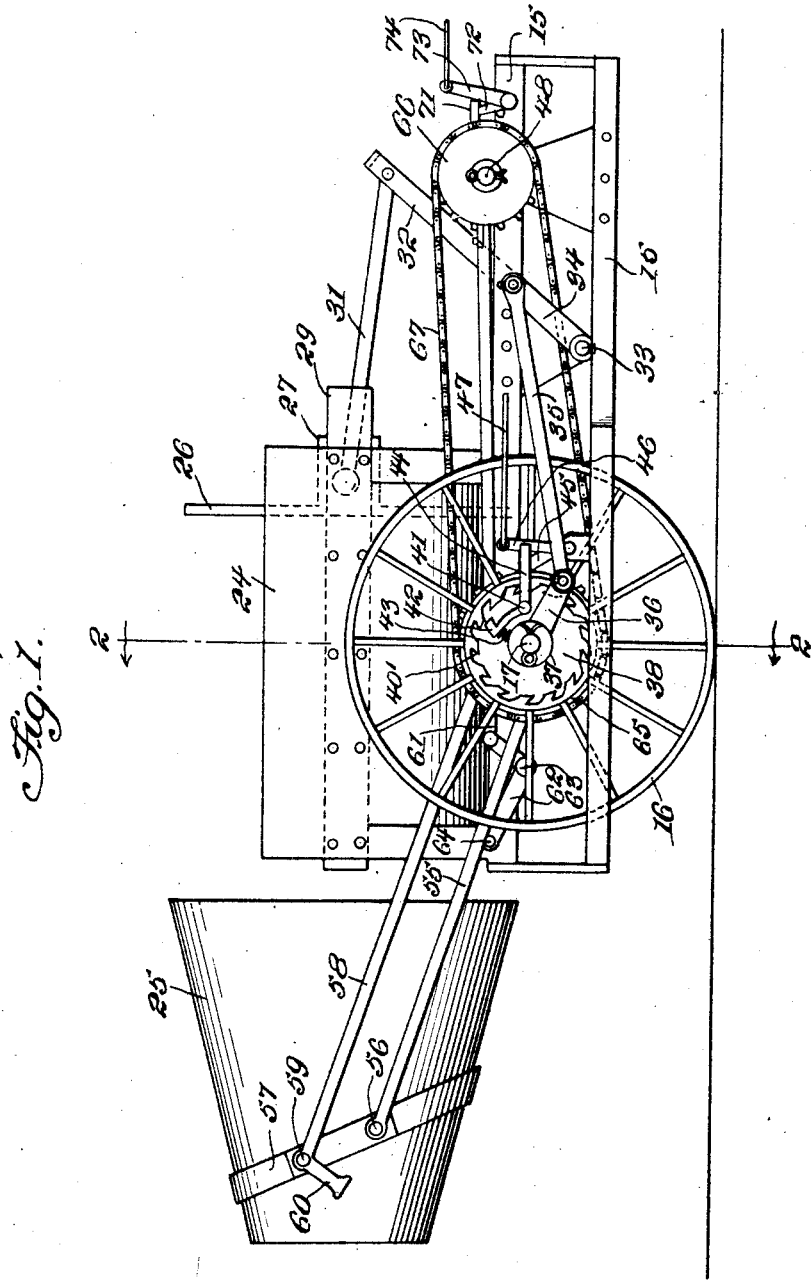
Figure 1 is a side elevation of a shocking machine constructed in accordance with the invention.

Referring to the drawings in detail wherein like characters of reference denote corresponding parts, the reference character 15 indicates the frame of the shocking machine which is supported at one side by a wheel 16, the latter being loose upon an axle 17 mounted in suitable bearings in the frame. The opposite side of the machine is supported by the frame of a harvesting machine, a portion of which is illustrated at 18, while the bull wheel of the harvester is shown at 19. The frame 15 of the shocking machine is connected to the frame 18 as illustrated at 20 in Figures 2 and 4 of the drawings. A portion of the deck of the harvesting machine is illustrated at 21 and the bundles of grain G are held upon this deck by means of a stop 22 which is manually controlled by a rod or wire 23 to release or hold the bundles.

Supported upon the frame 15 of the machine is a substantially semi-circular cradle or hopper 24 which is positioned to receive the bundles G from the deck of the harvester. The hopper 24 is open at its top and each end and the bundles are moved longitudinally of the hopper into a shock former 25 to be later explained.

For the purpose of moving the bundles there is provided a bundle mover 26 having substantially U-shaped slides 27 at diametrically opposite sides. These slides are carried at opposite ends of a cross bar 28 and receive guide bars 29 which are supported at opposite sides of the hopper 24.

Pivotally secured to spaced lugs 30 carried by the bar 28 are the inner ends of rods 31, the opposite ends of these rods being pivotally secured to spaced arms 32 which are rigid upon a shaft 33 mounted in suitable bearings extending transversely of the frame 15. Also rigid upon the shaft 33 is a crank arm 34 which is connected by means of a rod 35 with a crank arm 36, the latter being rigid with a sleeve 37 which extends from the outer face of a disk 38, the said sleeve and disk being formed upon the axle 17.

The disk 38 is located within a flange 39 which extends from the hub 40 of the wheel 16 and the inner periphery of this flange is notched to provide teeth 40. Pivotally mounted upon the disk 38 as shown at 41 is a dog 42 which is urged to engage the teeth 40 by means of a spring 43. Rigid with this dog is an arm 44 which is engaged by an arm 45, the latter being rigid with a crank arm 46 mounted in a bearing bracket carried by the frame 15. Connected to this arm 46 is a rod or wire 47.

By reference to Figures 1, 4, 5, and 6, it will be seen that normally the arm 40 engages the arm 45 so as to hold the dog 42 disengaged from the teeth 40 so that the disk 38 will remain stationary while the wheel 16 may rotate. A pull upon the rod or wire 47 in the direction indicated by the arrow in Figure 5 of the drawings, will move the crank arm 46 pivotally and disengage the arm 45 from the arm 44, so that the dog 42 will be released and the spring 43 will force the dog to engage the teeth 40. The disk 38 will then be locked with the wheel 16 and will rotate so as to rotate the crank arm 36 and rock the shaft 33 through the rod 35 and crank arm 34. This movement of the shaft 33 will slide the bundle mover 26 forward to the position shown by the dotted lines in Figure 3 and illustrated in Figure 10 and will force the bundle grain into the shock former 25.

By reference to the drawings it will be seen that the shock former is of hollow frusto conical form and is open at each end and when in the position shown in Figures 1 and 3 of the drawings will receive the bundled grain through its large end so that the opposite end of the former will compress the tops of the bundles leaving the bases of the latter relatively wide. The bundles will thus be arranged in shock formation.

In order to deposit the shock there is provided a shaft 48 which is mounted in suitable bearings provided in the frame 15 and which includes at each end crank arms 49 and 50, the latter being relatively long. The crank arms 50 are connected by rods 51 to the outer ends of the short arms 52 of levers which are rigidly mounted at the opposite ends of a shaft 53, the latter being also mounted in suitable bearings in the frame 15. The long arms 54 of these levers are connected to the inner ends of rods 55, while the outer ends of these rods are pivotally connected as shown at 56 to opposite sides of the shock former 25, the latter being provided with a band 57 which carries the pivots 56. The short arms 52 of these levers are also connected upon opposite sides of the shock former by means of rods 58, the points of connection of these rods with the shock former being indicated at 59. By reference to Figures 1 and 3 of the drawings it will be seen that the pivot points 56 and 59 are spaced apart and the rods 58 have extending rigidly therefrom arms 60, whose purpose will be later apparent.

The short arms 49 of the shaft 48 are connected by means of rods 61 with bell crank levers 62, the latter being pivotally mounted upon the frame 15 as indicated at 63. These bell crank levers 62 have extending laterally from their outer ends stops 64, whose purpose will also be later apparent.

Rigid with the hub of the wheel 16 is a sprocket wheel 65 which drives a sprocket wheel 66 by means of a chain 67. The wheel 66 is loose upon the shaft 48, while fast upon this shaft is a disk 68 which carries a pivotally mounted dog 69. The dog 69 is adapted to engage teeth 70 provided around the inner face of a flanged wheel 66, so as to form a clutch mechanism similar to that described in connection with the wheel 16. The dog 69 has rigid therewith an arm 71 and this arm is adapted to be engaged by an arm 72 which is rigid with a crank arm 73. The arm 73 is pivotally mounted in the frame 15 so that the arm 72 may be arranged to engage the arm 71 to hold the dog 69 disengaged from the teeth 70. A rod or wire 74 is connected to the arm 73 whereby the latter may be operated to disengage the arms 71 and 72 and permit the dog to engage the teeth so as to lock the sprocket 66 upon the shaft 48.

The shock former is supported in bundle receiving position by the engagement of the rods 55 with the lateral extensions 64 of the bell crank levers 62. After the bundles have been forced into the shock former, the rod or wire 74 is operated to lock the sprocket wheel 66 to the shaft 49 in the manner just described. This shaft will then be rotated and the arms 52 and 54 moved to swing the shock former in the direction indicated by the arrows in Figures 1 and 3 of the drawings. Simultaneous with this movement, the bell crank levers 62 are rocked upon their pivots to permit this movement. Downward movement of the shock former will continue until the said former reaches the position shown in Figure 10 of the drawings, in which position the arm 60 will engage the rod 55. As the large end of the shock former is the heaviest it will be assisted to the position shown in Figure 10 of the drawings by gravity. Continued rotation of the shaft 48 will raise the shock former in the direction indecated by the arrow in Figure 10 of the drawings as further movement outward or in the direction of the dotted arrow in said figure will be resisted by the arms 60. A substantially direct upward movement is thus imparted to the shock former so that the latter is lifted off of the shock. The shock former moves upward to the position illustrated in Figure 11 so that its lower end will be entirely free of the upper end of the shock. Continued forward movement of the shocking machine and consequently continued rotation of the shaft 48 will move the shock former downward as shown in Figure 12 until the said shock former again reaches the position illustrated in Figures 1 and 3. During this movement, the bell crank 62 which is moved to a position to lower the lateral extensions 64, will be again moved upward beneath the rods 55 to support the latter and hold the shock former in position to receive additional bundles from the hopper 24.

Operation of both the bundle mover and shock former will continue until the wheel 16 and the shaft 48 make a complete revolution, whereupon the arms 44 and 71 will engage their respective arms 46 and 72 so as to disengage the dogs 42 and 69. The bundle moving mechanism may be so operated as to permit of a complete operation of the bundle mover 26 before bringing the shock former into operation, or the shock former may be operated to deposit the shock at the time the bundle mover 26 is returning to its normal position.

The invention is susceptible of various changes in its form, proportions and minor details of construction and the right is herein reserved to make such changes as properly fall within the scope of the appended claims.

Having described the invention what is claimed is:—

1. In a shocking machine, a wheel supported hopper adapted to receive bundled grain, a shock former normally positioned to receive the bundles from the hopper, a bundle pusher operating within the hopper, means to operate the bundle pusher to transfer the bundles from the hopper to the shock former and means to move the shock former pivotally to deposit the shock in upright position subsequently swing the shock former upward above the shock and thereafter return the shock former to bundle receiving position.

2. In a shocking machine, a wheel supported hopper adapted to receive bundled grain, a shock former comprising a hollow frustro conical member positioned to receive the bundles from the hopper, means operating within the hopper to push the bundles from the hopper into the shock former, means to operate the bundle pushing means and means to dump the shock from the shock former and return the latter to original bundle receiving position.

3. In a shocking machine, a wheel supported hopper adapted to receive bundled grain, a shock former comprising a hollow frustro conical member positioned to receive the bundles from the hopper, a bundle pusher mounted for sliding movement within the hopper, a rock shaft, means connecting the rock shaft and bundle pusher to move the latter and force the bundles into the shock former, a nomally inactive rotary member, means connecting said rotary member and rock shaft to operate the latter, means to lock the rotary member to one of the hopper supporting wheels and means to dump the shock from the shock former.

4. In a shocking machine, a wheel supported hopper adapted to receive bundled grain, a shock former comprising a hollow frustro conical member positioned to receive the bundles from the hopper, a bundle pusher mounted for sliding movement within the hopper, a rock shaft, means connecting the rock shaft and bundle pusher to move the latter and force the bundles into the shock former, a normally inactive rotary member, means connecting said rotary member and rock shaft to operate the latter, means to lock the rotary member to one of the hopper supporting wheels, means to automatically release the rotary member at the end of a complete revolution and means to dump the shock from the shock former and return the latter to bundle receiving position.

5. In a shocking machine, a wheel supported hopper adapted to receive bundled grain, a shock former comprising a hollow frustro conical member positioned to receive the bundles from the hopper, means to push the bundles from the hopper into the shock former, a rock shaft, means to operate the rock shaft and means operated by the rock shaft to move the shock former pivotally and downward to deposit the shock and raise the shock former and return the same to its former bundle receiving position.

6. In a shocking machine, a wheel supported hopper adapted to receive bundled grain, a shock former comprising a hollow frustro conical member positioned to receive the bundles from the hopper, means to push the bundles from the hopper into the shock former, a rock shaft, oppositely extending arms rigid with said shaft, rods having their inner ends pivotally secured to the arms and their outer ends pivotally secured to the shock former in spaced relation, movable means in the path of one of the rods, to hold the shock former in bundle receiving position, means to operate the rock shaft and rod holding means to move the shock former pivotally to shock depositing position, means to prevent pivotal movement of the shock former during continued operation of the rock shaft to raise said shock former from the shock and return the shock former to bundle receiving position.

7. In a shocking machine, a wheel supported hopper adapted to receive bundled grain, a shock former comprising a hollow frusto conical member positioned to receive the bundles from the hopper, means to push the bundles from the hopper into the shock former, a rock shaft, oppositely extending arms rigid with said shaft, rods having their inner ends pivotally secured to the arms and their outer ends pivotally secured to the shock former in spaced relation, pivotally mounted substantially L-shaped arms disposed in the path of one of the rods to support the shock former in bundle receiving position, means to operate the rock shaft and rod holding means to move the shock former pivotally to shock depositing position, means to prevent pivotal movement of the shock former during continued operation of the rock shaft to raise said shock former from the shock and return the shock former to bundle receiving position.

8. In a shocking machine, a wheel supported hopper adapted to receive bundled grain, a shock former comprising a hollow frustro conical member positioned to receive the bundles from the hopper, means to push the bundles from the hopper into the shock former, a rock shaft, oppositely extending arms of different lengths rigid with said shaft, rods having their inner ends pivotally secured to the arms and their outer ends pivotally secured to the shock former in spaced relation, movable means in the path of one of the rods to hold the shock former in bundle receiving position, means to operate the rock shaft and rod holding means to move the shock former pivotally to shock depositing position, means to prevent pivotal movement of the shock former during continued operation of the rock shaft to raise said shock former from the shock and return the shock former to bundle receiving position.

9. In a shocking machine, a wheel supported hopper adapted to receive bundled grain, a shock former comprising a hollow frustro conical member positioned to receive the bundles from the hopper, means to push the bundles from the hopper into the shock former, a rock shaft, oppositely extending arms rigid with said shaft, rods having their inner ends pivotally secured to the arms and their outer ends pivotally secured to the shock former in spaced relation, means movable in the path of one of the rods to hold the shock former in bundle receiving position, means to operate the rock shaft and rod holding means to move the shock former pivotally to shock depositing position, a stop arm rigid with one of the rods and engaging the other rod to prevent pivotal movement of the shock former during continued operation of the rock shaft to raise said shock former from the shock and return the shock former to bundle receiving position.

10. In a shocking machine, a wheel supported hopper adapted to receive bundled grain, a shock former normally in position to receive the bundles from the hopper, means to transfer the bundles from the hopper to the shock former and means to move the shock former to deposit the shock in upright position and to return the shock former to its original bundle receiving position.

11. In a shocking machine, a wheel supported hopper adapted to receive bundled grain, a shock former comprising a hollow frusto-conical member having its larger end normally positioned to receive the bundles from the hopper, means to transfer the bundles from the hopper to the shock former and means to swing the shock former outward and downward to deposit the bundles and to thereafter return said shock former with its larger end in original bundle receiving position.

In testimony whereof I affix my signature.

EDWIN W. BROHOLM.